United States Patent
Hanes

(10) Patent No.: US 8,165,445 B2
(45) Date of Patent: Apr. 24, 2012

(54) SYSTEM, METHOD, AND COMPUTER-READABLE MEDIUM FOR ANALYZING AN MPEG-FORMATTED FILE

(75) Inventor: David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2616 days.

(21) Appl. No.: 10/753,251

(22) Filed: Jan. 8, 2004

(65) Prior Publication Data

US 2005/0152675 A1 Jul. 14, 2005

(51) Int. Cl.
*H04N 5/765* (2006.01)
*H04N 5/931* (2006.01)

(52) U.S. Cl. .......................................... 386/200; 386/204
(58) Field of Classification Search .................. 386/46
See application file for complete search history.

(56) References Cited

U.S. PATENT DOCUMENTS

| 6,078,328 A | 6/2000 | Schumann et al. |
| 6,205,223 B1 | 3/2001 | Rao et al. |
| 6,504,993 B1 | 1/2003 | Matsumoto |
| 6,628,839 B1 | 9/2003 | Komiya et al. |
| 6,647,061 B1 | 11/2003 | Panusopone et al. |
| 6,973,130 B1 * | 12/2005 | Wee et al. ................ 375/240.16 |
| 7,236,526 B1 * | 6/2007 | Kitamura ................ 375/240.16 |
| 2001/0026511 A1 * | 10/2001 | Ueda et al. ................ 369/47.14 |
| 2002/0044760 A1 * | 4/2002 | Shirakawa et al. ............ 386/65 |
| 2002/0169742 A1 * | 11/2002 | Nakamura et al. ............... 707/1 |
| 2004/0136352 A1 * | 7/2004 | Fu et al. ........................ 370/341 |

FOREIGN PATENT DOCUMENTS

| EP | 1 524 855 | 4/2005 |
| JP | 2002169251 | 6/2002 |
| WO | WO 02/097603 | 12/2002 |
| WO | WO 03/048904 | 6/2003 |

OTHER PUBLICATIONS

International Search Report dated May 10, 2005 issued in the corresponding United Kingdom Patent Application No. 0500034.4.

\* cited by examiner

*Primary Examiner* — William C Vaughn, Jr.
*Assistant Examiner* — Oluwaseun A Adegeye

(57) ABSTRACT

A system for analyzing a moving pictures expert group (MPEG)-formatted file comprises a format analysis application and a processing element operable to execute the application. The application is adapted to read a rule having at least one logical instruction defining a format requirement and compare a portion of the file with the rule. A determination of validity of the file is made by the application dependent upon a result of the comparison.

26 Claims, 3 Drawing Sheets

SYSTEM, METHOD, AND COMPUTER-READABLE MEDIUM FOR ANALYZING AN MPEG-FORMATTED FILE

TECHNICAL FIELD

This invention relates to video and audio technologies and, more particularly, to a system, method, and computer-readable medium for analyzing a moving pictures expert group-formatted file.

BACKGROUND

The proliferation of the Internet has resulted in consumer demand for numerous bandwidth-intensive services. As market penetration of wideband consumer communications equipment, such as digital subscriber line technologies, cable modems and other high-bandwidth end-user equipment, increases, the demand for data-intensive services also increases. Downloading music and video files has already become commonplace for a large portion of Internet users. Moreover, the prevalence of consumer imaging technologies, such as digital cameras, digital camcorders and other digital media recorders, and personal computer (PC) video editing software applications has increased demand for data-intensive storage technologies.

Advances in data storage technologies are continually being made. Although magnetic hard drives offer gigabytes of storage space, many users consume massive amounts of storage space in relatively short periods of time. Many consumers have turned to removable data storage media due to the relatively low cost and ease of use. Compact disc (CD) recorders, or "burners," are particularly attractive to consumers seeking low cost and high data storage capabilities. The introduction of re-writeable CD burners has further increased the convenience of compact disc media. Furthermore, the interchange capabilities provided by writeable compact disc media further enhances the market acceptance of compact disc drives and media. Digital versatile disc (DVD) recorders utilizing recordable DVD and re-writeable DVD technologies also provide an attractive format for consumers to store large multimedia files generated by, for example, camcorders, PC video, and the like, because of the advanced features of DVD such as interactivity, direct access, large storage capacity, and nominal cost.

Although writeable DVD drives are capable of writing data to DVDs that are compatible with most available DVD players for reading data therefrom, e.g., DVD drives included in a personal computer system, a barrier remains for effectively harnessing the capabilities of writeable DVDs. Presently, specialized software, commonly referred to as video mastering software, is required to format video files, such as moving pictures expert group-1 and -2 (MPEG-1 and MPEG-2) files and other computer video and audio file formats, into a form suitable for storage and playback by a DVD decoder. The DVD-video specification currently provides for 133 minutes per DVD data layer, or more, of high quality MPEG-2 encoded video with multi-channel surround sound. However, MPEG-2 standards are less stringent than DVD-video standards, and due to the abundance of variant MPEG coders, variations in MPEG-2 formatted files are common. Consequently, files may be suitably formatted for playback by an MPEG-2 decoder yet unsuitable for storage and playback by a DVD decoder.

SUMMARY OF THE INVENTION

In accordance with an embodiment of the present invention, a method of analyzing a MPEG-formatted file comprises defining a rule comprising at least one parameter that logically defines a format requirement. The method also comprises reading a portion of the file, comparing the portion of the file with the rule, and determining whether the file violates the rule.

In accordance with another embodiment of the present invention, a system for analyzing a moving pictures expert group (MPEG)-formatted file comprises a format analysis application and a processing element operable to execute the application. The application is adapted to read a rule having at least one logical instruction defining a format requirement and compare a portion of the file with the rule. A determination of validity of the file is made by the application dependent upon a result of the comparison.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1-6 of the drawings, like numerals being used for like and corresponding parts of the various drawings.

MPEG-2 is most often the compression choice for DVD-video although MPEG-1 compressed video may be used as well. MPEG-2 provides superior video quality and is used for such applications as digital television and DVD-video and is defined in international organization for standardization (ISO) 13818. Briefly, MPEG video comprises sequences of video frames, or pictures, subjected to compression. In general, each video frame is divided into macroblocks each comprising four blocks of luminance (Y) and one block each of U and V color. Each macroblock is compressed using well-known discrete cosine transform (DCT) encoding and motion compensation.

Each MPEG video frame may be any one of three general types: an intra-coded (I) frame, a predicted (P) frame, or a bi-directional (B) frame. I frames are encoded using DCT encoding and are compressed without reference to any other frame. Typically, I frames are included in a frame sequence every 12 to 18 frames. Decoding of a video sequence starts at an I frame and, consequently, fast forward, reverse, and direct access are performed by decoding an I frame. A P frame is coded as a difference from a previous I frame or, alternatively, another previous P frame. B frames are encoded as differences from previous or subsequent frames in a frame sequence. I, P, and B frames are interleaved in a frame sequence with playback always initiated from an I frame.

Figure 1:
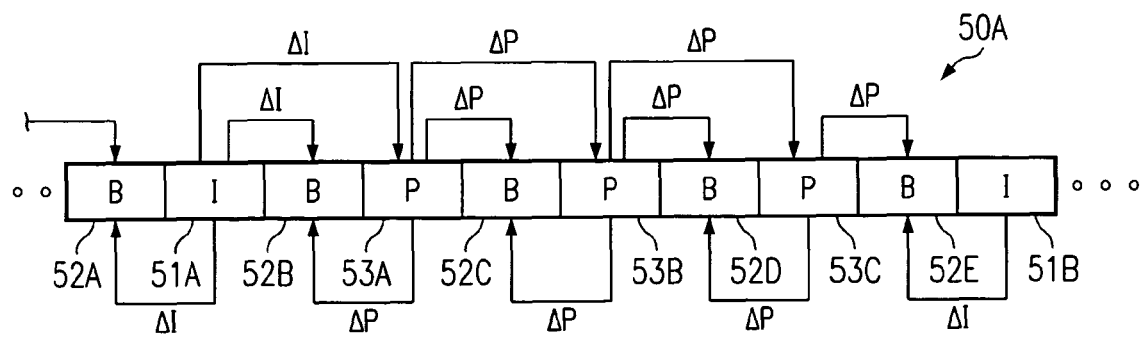
FIG. 1 is a diagram illustrating a portion of a moving pictures expert group frame sequence for use with an embodiment of the present invention.
Figure 2:
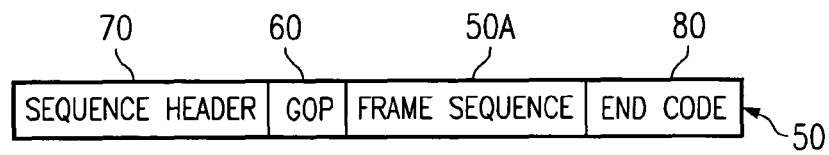
FIG. 2 is a diagram illustrating a sequence header that may be followed by a group of pictures header in a video/audio object for use with an embodiment of the present invention.

With reference to FIG. 1, there is illustrated a portion of an example MPEG frame sequence 50A comprising a sequence of interleaved I frames 51A and 51B, B frames 52A-52E, and P frames 53A-53C as may be stored in a video/audio (V/A) or multimedia object on a DVD. As shown, each B frame is encoded as a difference from a previous or subsequent P frame ($\Delta P$) or I frame ($\Delta I$). Each P frame is encoded as a difference from the most recent I frame or P frame. For example, P frame 53A is encoded as a difference from previous I frame 51A while P frame 53B is encoded as a difference from previous P frame 53A. The order in which individual frames of sequence 50A are displayed during playback will vary from the order in which the frames are stored as is necessary for decoding of B frames.

A V/A or multimedia object comprises frame sequence 50A. In addition to frames 51A-51B, 52A-52E, and 53A-53C, a video sequence 50 of the V/A object has a sequence header 70 followed by a group of pictures (GOP) header 60, as shown in the simplified schematic of V/A or multimedia object 22A of FIG. 2. Additionally, an end code 80 is appended to video sequence 50. While individual frames 51A-51B, 52A-52E, and 53A-53C are illustrated as contiguously adjacent in frame sequence 50A, various headers may be inserted between two otherwise adjacent frames. For example, a repeat sequence header and/or a GOP header 60 may be inserted between two adjacent frames.

Sequence header 70 comprises a 32-bit sequence header code followed by various elements that define respective parameters or characteristics of frame sequence 50A. For example, 12-bit horizontal size value and vertical size value elements respectively define the width and height of the displayable portion of a luminance component of encoded frames. A 4-bit frame rate code and an 18-bit bit-rate value element respectively define a display frame rate and a stream bit rate in bits-per-second to which frame sequence 50A should be processed. Sequence header 70 may comprise other data as well, including, but not limited to, aspect ratio information and buffer size.

GOP header 60 comprises a 32-bit group start code, a 25-bit time code, a 1-bit closed GOP flag and a 1-bit broken link flag. The group start code is a predefined bit string (000001B8) that marks the beginning of a group of pictures header. The 25-bit time code comprises various parameters defined by one or more of the 25 bits including, but not limited to, a drop frame flag, a time code hours, a time code minutes, time code seconds and time code pictures. The closed GOP flag indicates the type of prediction used for adjacent B frames following the initial I frame subsequent GOP header 60. The broken link flag is used to avoid display of frames that cannot be correctly decoded.

Figure 3:
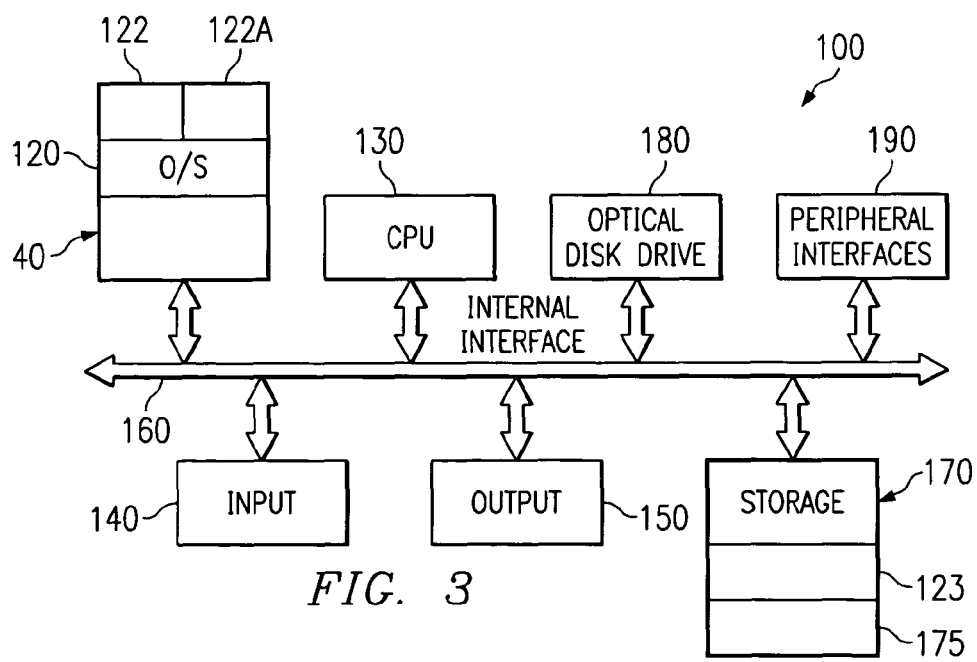
FIG. 3 is a block diagram illustrating an embodiment of a moving pictures expert group multimedia object analysis system in accordance with the present invention.

FIG. 3 is a diagram illustrating a MPEG multimedia object analysis system 100 in accordance with the present invention. In the illustrated embodiment, a file analysis application 122 is stored in a memory unit 40 for analyzing MPEG-formatted data according to embodiments of the invention. Application 122 is executed by an operating system 120 and one or more processing element(s) 130, such as a central processing unit. Operating system 120 controls the resources of system 100 and interfaces the instructions of application 122 with processing element 130 to enable application 122 to properly run.

As shown, processing element 130 communicates to and drives the other elements within system 100 via a local interface 160, which may comprise one or more buses. Furthermore, an input device 140, for example a keyboard or a mouse, is used to input data from a user of system 100, and an output device 150, for example a display device or a printer, is used to output data to the user. A disk storage device 170, such as a magnetic disk, is connected to local interface 160 for data transfers therewith. A writeable DVD drive 180 is interconnected with interface 160 or one of various peripheral interfaces 190 such as a peripheral computer interconnect (PCI) interface, a universal serial bus, or another suitable interface.

In the embodiment illustrated in FIG. 3, an MPEG file 175, for example an MPEG-2 formatted file, is stored in disk storage device 170. Processing element 130 retrieves file 175 from device 170 and loads file 175 into memory unit 40 for analysis by application 122. Application 122 comprises and/or accesses at least one rule set 123 that defines parameters against which particular portions of file 175 may be compared for compatibility with DVD video and/or audio format standards for recording to, and playback from, a DVD.

Prior to the present invention, a particular problem encountered when recording of an MPEG file on a writeable DVD is associated with GOP header 60. MPEG-1 and MPEG-2 formatted video specifications enable all frames of video sequence 50A to be encoded as key, or I-frames; inclusion of GOP header 60 in an MPEG encoded multimedia file is optional. However, DVD decoders require the inclusion of GOP header 60 for proper playback. Thus, MPEG-formatted file 175 may be suitably encoded for playback by an MPEG decoder but be unsuitable for playback by a DVD device. Often a user attempting to create a DVD with an MPEG-formatted file has no direct knowledge of the source encoder used for creation of the MPEG file. In such a situation, the user may process the MPEG file with a DVD encoder, or mastering software, and write the file to a DVD as part of DVD file structure 5. Not until attempted playback with a DVD decoder does the user become aware of an incompatibility between the MPEG file and the required DVD format. In the event the source MPEG file was encoded without GOPs, the DVD player will be unable to process the DVD file for playback. In addition to inconveniencing the user, the DVD to which the MPEG file was written is ruined (in the case that a write-once DVD is used) or requires erasing (in the case that a re-writeable DVD is used).

Embodiments of the present invention facilitate detection of incompatibly or noncompliantly encoded MPEG files by analyzing at least one portion of the MPEG-formatted file for discrepancies with DVD video and/or audio format requirements. For example, in some embodiments, application 122 reads a V/A object to determine the location of sequence header 70. The data content of the V/A object intermediate sequence header 70 and frame sequence 50A is analyzed, for example subjected to a pattern recognition algorithm, and evaluated for the presence of GOP header 60. In the event a GOP header is not located in the MPEG portion intermediate sequence header 60 and frame sequence 50A, application 122 determines that the MPEG-formatted file is incompatible for recording on a DVD. Application 122 may provide a notification, for example display of a message on output device 150, to inform the user accordingly and/or transcode the MPEG file, that is decode the MPEG data and subsequently re-encode the decoded data according to the MPEG rule set.

MPEG specifications define header codes for various fields of a data stream. TABLE A summarizes various MPEG start codes that may be evaluated for compatibility with DVD file structure standards. In one embodiment, application 122 identifies one or more portions of MPEG file 175 for analysis by identification of particular start codes. For example, application 122 determines the location of sequence header 70 by recognition of the sequence header start code and scans the portion of the MPEG data stream subsequent the sequence header start code until either sequence end code 80 or a group of pictures start code is encountered. In the event sequence end code 80 is encountered without detection of a group of pictures start code, application 122 determines that the MPEG file 175 is unsuitably encoded for playback from a DVD decoder and preferably provides an indication thereof to the user.

TABLE A

| Start Code | Designated Field |
|---|---|
| 0 × 00 | Picture |
| 0 × 01 - 0 × AF | Slice |
| 0 × B0 | Reserved |
| 0 × B1 | Reserved |
| 0 × B2 | User data |
| 0 × B3 | Sequence header |
| 0 × B4 | Sequence error |
| 0 × B5 | Extension |
| 0 × B6 | Reserved |
| 0 × B7 | Sequence end |
| 0 × B8 | Group of Pictures |

In another embodiment of the present invention, application 122 evaluates an MPEG-file 175 for encoding characteristics that violate not only DVD specifications, but MPEG specifications as well. For example, ISO 13818 specifies that MPEG-2 video has a maximum allowable data rate of 9.8 Mb/s. Each MPEG sequence header 70 includes an 18-bit field that specifies the sequence bit rate. Application 122 reads the bit rate field value and determines whether the MPEG file 175 is encoded in excess of the allowable encoding rate. Preferably, application 122 determines the bit rate of a frame sequence by reading a portion of MPEG file 175 by addressing the sequence header (0xB3) and an appropriate offset. The bit rate field is allocated the $8^{th}$ and $9^{th}$ bytes of the sequence header 70 and bits 7 and 6 of sequence header 70 byte 10.

In some embodiments, application 122 first evaluates an MPEG rule set comprised of one or more rules logically defining one or more characteristics of the MPEG standard, e.g. ISO 13818. For example, the MPEG rule set may comprise a bit rate rule that defines a maximum allowable bit rate for an acceptably formatted MPEG file. Violation of any rule of the MPEG rule set may result in notice thereof provided as an output display message to the user and/or transcoding of the MPEG file. An evaluation of the encoded bit rate of an MPEG video stream is exemplary only and a rule set evaluated according to embodiments of the present invention may comprise tens, or even hundreds, of individual rules.

In some embodiments, after evaluation of file 175 for violation of any rules of the MPEG rule set, MPEG file 175 is compared against a compatibility rule set comprised of one or more rules logically defining DVD format requirements. For example, the compatibility rule set may include a rule comprising one or more parameters logically defining the inclusion of GOP header 60 in MPEG file 175 for compatibility with DVD video decoder requirements. A determination that GOP header 60 does not exist in file 175 results in a compatibility violation and a notice thereof is preferably provided to the user by application 122. Other rules of the compatibility rule set test for other DVD-format incompatibilities. In the embodiments described above, application 122 first evaluates an MPEG rule set comprised of one or more rules logically defining one or more characteristics of the MPEG standard to evaluate MPEG file 175 and then compares MPEG file 175 with a compatibility rule set comprised of one or more rules logically defining DVD format requirements. However, it should be understood that the order of rule set analysis may be otherwise varied.

Preferably, application 122 is implemented in software and can be adapted to run on different platforms and operating systems. In particular, logical functions implemented by application 122 may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium.

Figure 4:
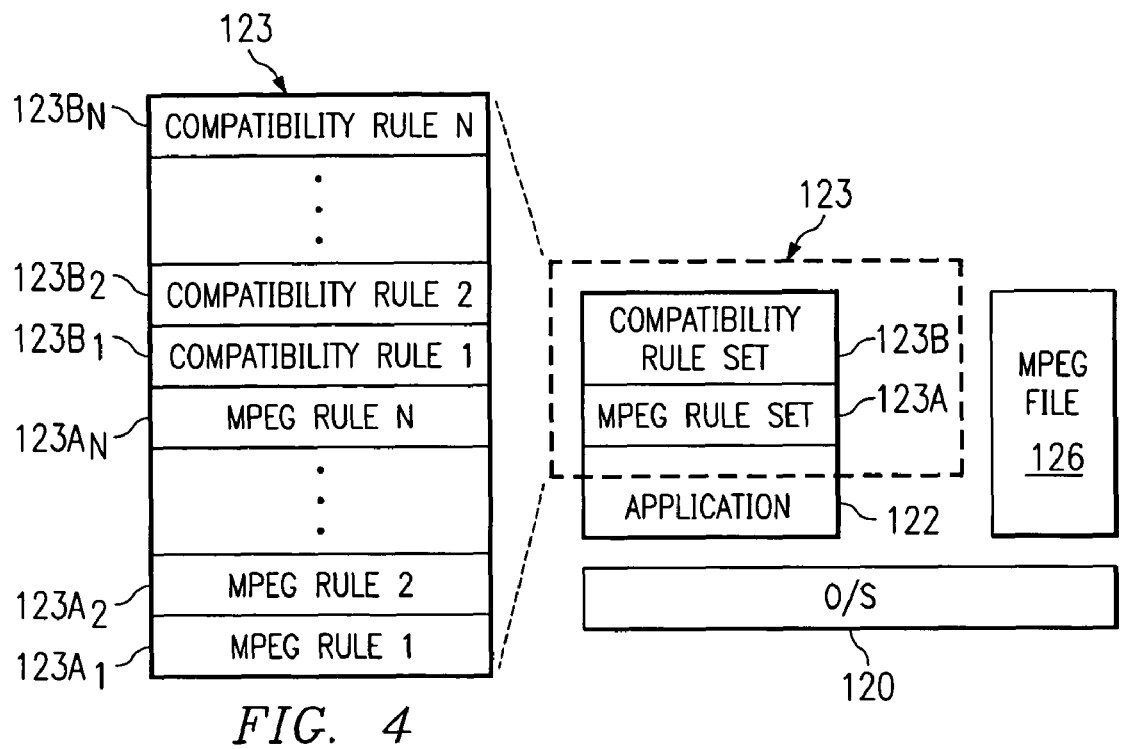
FIG. 4 is a diagram illustrating a software application for performing analysis of file content and format as may be implemented according to an embodiment of the present invention.

FIG. 4 is a schematic of application 122 as may be implemented in an embodiment of the present invention. Application 122 is executed by O/S 120 and interfaces or includes one or more rule sets 123. In the illustrative example, rule sets 123 comprise an MPEG rule set 123A and a compatibility rule set 123B, each respectively comprising one or more rules $123A_1$-$123A_N$ and $123B_1$-$123B_N$. Rule sets 123 are preferably maintained in a database stored in storage device 170 and retrievable by application 122. For example, rule sets 123 may be maintained in a table comprising records, each respectively defining a rule $123A_1$-$123B_N$. Rules $123A_1$-$123B_N$ may comprise respective routines and/or subroutines executable by application 122, functions, or operands that parametrically define an MPEG or DVD format requirement. For example, rules $123A_1$-$123B_N$ may comprise one or more parameters that logically define a format requirement that is processed by application 122.

Figure 5:
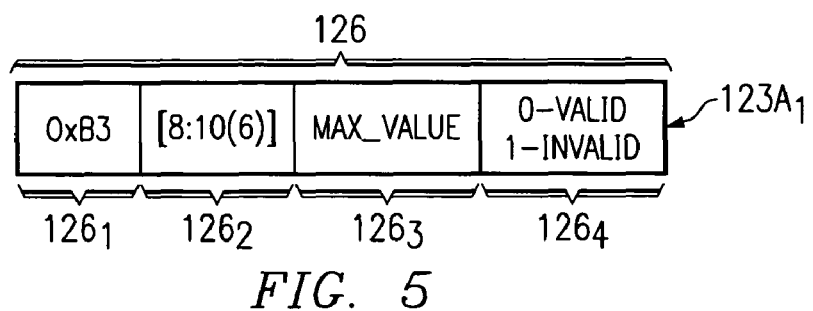
FIG. 5 is a diagram illustrating one example rule that may be included within a rule set and stored in a database retrievable by the application described with reference to FIG. 4, according to an embodiment of the present invention.

FIG. 5 is a schematic of an example rule $123A_1$ that may be included within MPEG rule set 123A retrievable by application 122, according to an embodiment of the present invention. Rule $123A_1$ comprises fields 126, each containing one or more parameters for analysis by application 122. In the present example, rule $123A_1$ comprises logical parameters defining a pre-determined maximum bit rate for MPEG-formatted video. In the illustrative example, a first field $126_1$ identifies a start code, e.g., 0xB3, that designates the beginning of sequence header 70. Application 122 scans a portion of file 175 until recognition of the start code identified by field $126_1$ is made. Field $126_2$ specifies an offset to be addressed and read from the address of the associated start code. The address offset 8:10(6) in this example specifies that bytes 8 and 9 and the two most significant bits of byte 10—the allocated address space of an MPEG-2 sequence header for the bit rate field—are to be read by application 122 and compared with a maximum value (Max_value) allowed. Application 122 may perform a Boolean comparison between the bit field value read from the specified address designated by fields $126_1$ and $126_2$ and the maximum value specified by field $126_3$, and generate a valid or invalid designation therefrom. In a similar manner, other rules of rule set 123A are evaluated and compatibility rule set 123B as well. Preferably, any evaluation of a format or incompatibility violation is appended to an error log that is output upon processing of all rules $132A_1$-$123B_N$.

Figure 6:
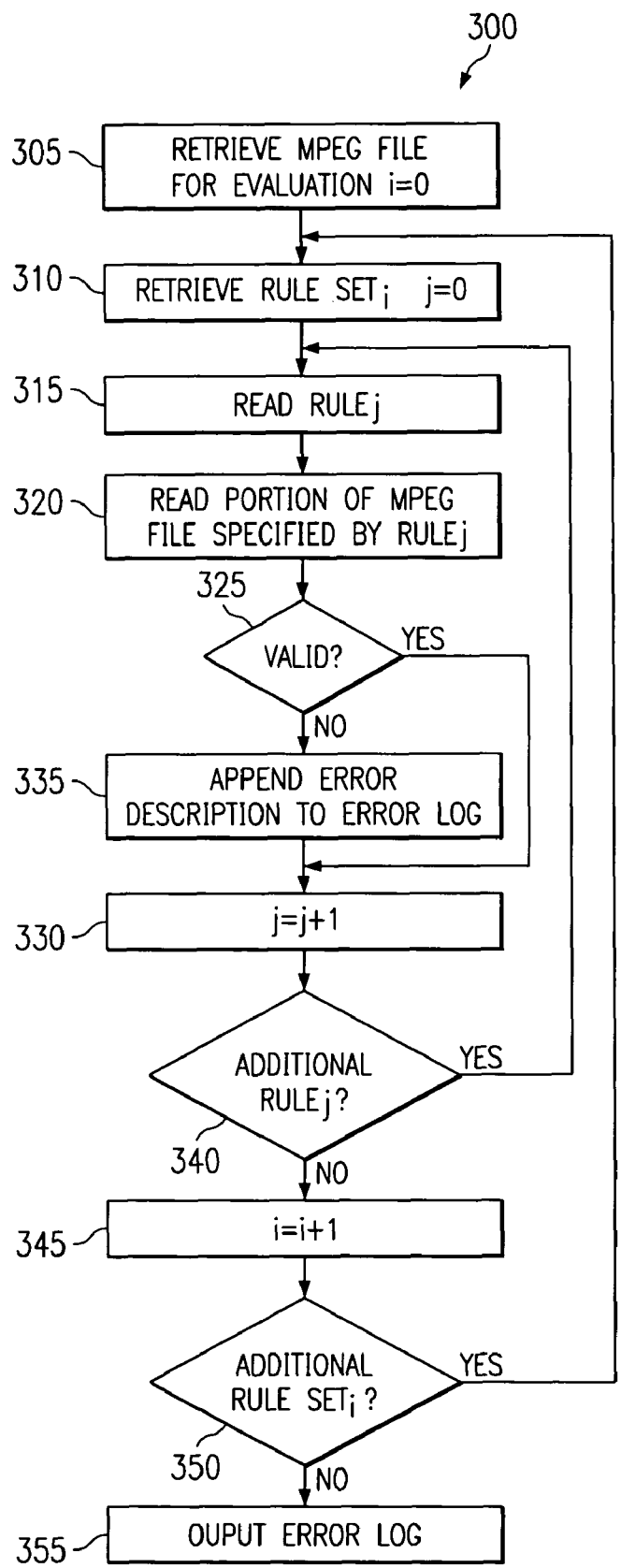
FIG. 6 is a flowchart illustrating an embodiment of a moving pictures expert group multimedia object analysis method in accordance with the present invention.

FIG. 6 is a flowchart 300 of application 122 processing according to an embodiment of the present invention. Application 122 processing is initiated by retrieving MPEG-formatted file 175 for analysis (block 305). Upon retrieval of file 175, an index i, or counter, is initialized in the event a plurality of rule sets are to be tested. A rule $set_i$ is then retrieved by application 122 and a rule index j is initialized (block 310). Rule $set_i$ is read by application 122 and a portion of MPEG file 175 specified for testing by $rule_j$ is read (block 320). An evaluation of whether the addressed portion of MPEG file 175 is valid is made (block 325) according to the indexed $rule_j$. In the event that the tested portion of file 175 does not violate $rule_j$, the rule index j is incremented (block 340). Determination of a format violation results in application 122 appending an error message to an error log (block 335) and incrementing of the rule index (block 330). The rule index j is evaluated to determine if any rules remain in the rule $set_i$ being tested (block 340). If additional rules remain for evaluation of file 175, application 122 returns to processing of the currently indexed $rule_j$ (block 315). The rule set index i is incremented (block 345) upon completing evaluation of all rules of the currently indexed rule $set_i$, and application 122 evaluates whether any remaining rule sets remain for testing (block 350). If another rule $set_i$ remains for testing, the rule index j is re-initialized and the rule $set_i$ is retrieved for testing (block 310) and processing of the rules of the newly indexed rule set commences. Application 122 processing completes by output of an error log after all rules of each rule set (block 355) have been evaluated.

It should be understood that in the method described in FIG. 7, certain functions may be omitted, combined, or accomplished in a sequence different than depicted in FIG. 7. Also, it should be understood that the method depicted in FIG. 7 may be altered to encompass any of the other features or aspects described elsewhere in the specification.

What is claimed is:

1. A method of analyzing a moving pictures expert group (MPEG)-formatted video/audio file, comprising:
   retrieving, by a processing element, a rule set that includes an MPEG rule and a compatibility rule, said MPEG rule defining a format requirement for the file to be decoded by a first type of MPEG-capable decoder, and the compatibility rule defining a format requirement for the file to be decoded by a second type of MPEG-capable decoder;
   reading, by the processing element, a portion of the file;
   comparing, by the processing element, the portion of the file with the MPEG and compatibility rules contained in the rule set, the rule set not contained in said file;
   based on said comparing the portion of the file with the MPEG and compatibility rules, determining, by the processing element, whether the file violates any of the MPEG and compatibility rules contained in the rule set; and
   as a result of determining that the file violates any of the MPEG and compatibility rules, performing, by the processing element, at least one of transcoding the file and alerting a user as to the violation.

2. The method according to claim 1, wherein the MPEG rule comprises a parameter for addressing the portion of the file.

3. The method according to claim 2, wherein the parameter specifies a bit rate of the file.

4. The method according to claim 1, wherein at least one of the rules comprises at least one parameter logically defining a standardized format requirement.

5. The method according to claim 1, wherein at least one of the rules comprises at least one parameter logically defining a MPEG format requirement.

6. The method according to claim 1, wherein the compatibility rule comprises at least one parameter logically defining a digital versatile disc (DVD) format requirement.

7. The method according to claim 1, wherein reading a portion of the file comprises locating a sequence header of the file.

8. The method according to claim 1, wherein comparing the portion of the file comprises determining whether the file comprises a group of pictures (GOP) header, and wherein performing at least one of transcoding and alerting occurs based upon determining that a GOP header is not present in the file.

9. The method according to claim 1, wherein performing at least one of transcoding and alerting comprises transcoding the file based upon determining the file violates any of the rules.

10. A system for analyzing a moving pictures expert group (MPEG)-formatted file, comprising:
    a format analysis application; and
    a processing element operable to execute the application, the application reading a rule set that includes an MPEG rule and a compatibility rule, said MPEG rule defining a format requirement for the file to be decoded by a first type of MPEG-capable decoder, and the compatibility rule defining a format requirement for the file to be decoded by a second type of MPEG-capable decoder;
    wherein the application is configured to compare the file to the rules and to transcode the file based upon a determination that the file violates at least one of the rules.

11. The system according to claim 10, wherein at least one of the rules defines a moving pictures expert group (MPEG) format requirement.

12. The system according to claim 10, wherein the compatibility rule comprises defines a digital versatile disc (DVD) format requirement.

13. The system according to claim 10, wherein the application is adapted to compare a bit rate of the file with the MPEG rule.

14. The system according to claim 10, wherein the compatibility rule specifies whether the file must comprise a group of pictures (GOP) header.

15. The system according to claim 10, wherein the application is adapted to read the file to determine a location of a sequence header of the file.

16. The system according to claim 10, wherein the application is adapted to determine whether the file comprises a group of pictures disposed between a sequence start code and a sequence end code of the file.

17. A computer-readable memory unit having stored thereon an instruction set to be executed, the instruction set, when executed by a processor, causes the processor to:
    read a rule set that includes an MPEG rule and a compatibility rule, said MPEG rule defining a format requirement for the file to be decoded by a first type of MPEG-capable decoder, and the compatibility rule defining a format requirement for the file to be decoded by a second type of MPEG-capable decoder;
    read a portion of the MPEG-formatted file;
    compare the portion with the rule set;

based on said comparison of the portion of the file with the MPEG and compatibility rules, determine whether the portion violates any of the rules in the rule set; and as a result of a determination that the file violates any of the MPEG and compatibility rules, perform at least one of transcoding the file and alerting a user as to the violation.

18. The computer-readable memory unit according to claim 17, wherein at least one of the rules defines a MPEG format requirement.

19. The computer-readable memory unit according to claim 17, wherein the compatibility rule logically defines a digital versatile disc (DVD) format requirement.

20. The computer-readable memory unit according to claim 17, wherein the instruction set, when executed by the processor, causes the processor to determine wither the file comprises a group of pictures (GOP) header.

21. The computer-readable memory unit according to claim 17, wherein the instruction set, when executed by the processor, causes the processor to locate a sequence header of the file.

22. The computer readable memory unit according to claim 14, instruction set, when executed by the processor, causes the processor to transcode the file if the file violates at least one of the rules in the rule set.

23. The computer-readable memory unit according to claim 17, wherein the instruction set, when executed by the processor, causes the processor to determine whether the file comprises a group of pictures disposed between a sequence start code and a sequence end code of the file.

24. A system for analyzing a moving pictures expert group (MPEG)-formatted file, comprising:
a format analysis application; and
a processing element operable to execute the application, the application reading a rule having at least one logical instruction defining a digital versatile disc (DVD) format requirement, the rule specifying a particular portion of the file to be tested by the rule, and the application comparing the specified portion of the file with the rule, the application making a determination of validity of the file with the DVD format dependent upon a result of the comparison;
wherein the rule specifies whether the file must have a group of pictures (GOP) header; and
wherein, upon making a determination that the file is invalid, the processor element transcodes the file.

25. The system of claim 24, wherein the application is configured to transcode the file to comply with the rule in response to a determination that the specified portion of the file violates the rule.

26. The method of claim 1 wherein:
the MPEG rule specifies a maximum bit rate value and a location within a sequence header of the file at which a bit rate encoded in the file is located, and
the compatibility rule specifies that a GOP header must be present in the file.

* * * * *

UNITED STATES PATENT AND TRADEMARK OFFICE
CERTIFICATE OF CORRECTION

| | | |
|---|---|---|
| PATENT NO. | : 8,165,445 B2 | Page 1 of 1 |
| APPLICATION NO. | : 10/753251 | |
| DATED | : April 24, 2012 | |
| INVENTOR(S) | : David H. Hanes | |

It is certified that error appears in the above-identified patent and that said Letters Patent is hereby corrected as shown below:

In the Claims:

In column 9, line 15, in Claim 20, delete "wither" and insert -- whether --, therefor.

In column 9, line 21, in Claim 22, delete "computer readable" and insert -- computer-readable --, therefor.

In column 9, lines 21-22, in Claim 22, delete "claim 14," and insert -- claim 17, --, therefor.

Signed and Sealed this
Thirtieth Day of April, 2013

Teresa Stanek Rea
*Acting Director of the United States Patent and Trademark Office*